United States Patent [19]
Pezzullo et al.

[11] Patent Number: 5,615,257
[45] Date of Patent: Mar. 25, 1997

[54] SCREEN-BASED TELEPHONE SET FOR INTERACTIVE ENHANCED TELEPHONY SERVICE

[75] Inventors: William V. Pezzullo, Bromley, N.C.; Michel J. Brisebois, Chelsea, Canada; Joseph B. Johns, Calgary, Canada; Kenneth M. Orford, Kanata, Canada; Kristin J. Travis; Bruce H. Tsuji, both of Nepean, Canada; William T. Ross, Dunrobin, Canada; Andre J. Robert, Woodlawn, Canada; Clifford D. Read, Stittsville, Canada

[73] Assignee: Northern Telecom Limited, Montreal, Canada

[21] Appl. No.: 354,599

[22] Filed: Dec. 13, 1994

[30] Foreign Application Priority Data

Jan. 4, 1994 [CA] Canada .................................. 2112757

[51] Int. Cl.⁶ .............................. H04M 1/56; H04M 1/27; H04M 11/08
[52] U.S. Cl. .............................. 379/396; 379/96; 379/97; 379/112; 379/201; 345/10
[58] Field of Search ........................... 379/396, 97, 399, 379/395, 94, 96, 201, 215, 127, 351; 345/10, 123, 124, 130, 146, 168, 169, 172; 395/156; 340/712

[56] References Cited

U.S. PATENT DOCUMENTS

| 5,263,084 | 11/1993 | Chaput et al. | 379/215 |
| 5,392,337 | 2/1995 | Baals et al. | 379/396 |
| 5,402,477 | 3/1995 | McMahan et al. | 379/201 |

*Primary Examiner*—Thomas W. Brown
*Assistant Examiner*—Jacques M. Saint-Surin
*Attorney, Agent, or Firm*—Thomas R. Vigil

[57] ABSTRACT

An interactive subscriber telephone terminal, comprising: a display screen; a plurality of temporarily definable response/data entry keys; and local control means for selectively causing the display screen and/or the response/data entry keys to be controlled by one of: remote signals transmitted to the terminal from a telephone switching office, and the local control means.

7 Claims, 15 Drawing Sheets

SCREEN-BASED TELEPHONE SET FOR INTERACTIVE ENHANCED TELEPHONY SERVICE

CROSS-REFERENCE TO RELATED APPLICATION

The present application is related to previously filed, commonly owned, United States patent application entitled "A METHOD OF OPERATING A MICROPROCESSOR CONTROLLED TELEPHONE SET", Ser. No. 08/354,658, filed on Dec. 13, 1994, in the name of Robert B. Turnbull et al, and the said application is incorporated herein by reference.

BACKGROUND OF THE INVENTION

1. Field of the Invention

The present invention relates to telephone subscriber terminals in general, and in particular to those having a display screen. More particularly, it relates to a set capable of user interaction by means of soft-keys the definition of which may be downloaded through a thereto connected central office (CO). The set is, therefore, configurable in a limited way to permit remote, but user friendly operation, for banking, shopping, or such other interactive services as may be offered and/or supported by telephone companies and their customers.

2. Prior Art of the Invention

In U.S. patent application Ser. No. 07/733,027 filed Jul. 22, 1991 by G. Chaput et al, a method of transmitting data between a CO and a subscriber terminal is disclosed wherein data bursts may be transmitted to the terminal while off-hook, thus enabling the terminal to be in a data interactive mode at the same time while in voice communication mode.

In December 1992 an industry-wide standard protocol for Analog Display Services Interface (ADSI) was completed by Bell Communications Research Inc. to serve as a standard for voice and display (data) information to be transmitted between subscriber terminals and telecommunications switches or servers over the existing copper telephone lines (loops). This standard protocol also defines the formats for the large scrollable displays and softkeys to support new enhanced, interactive, services.

SUMMARY OF THE INVENTION

The present invention provides an interactive subscriber terminal (telephone set) for supporting the above enhanced capabilities at the subscriber's homes or offices. This is achieved without having to memorize codes, or to listen to several voice prompts.

A relatively large scrollable display and context-sensitive softkeys provide an improved subscriber terminal for making full use of services typically provided by telephone operating companies, as well as for those services provided by enhanced service providers (ESP) delivering third party services and applications through the telephone network.

Enhanced service providers (ESPs) are the second major source of ADSI-based services. ESP applications are driven by information downloaded to the terminal from a server—for example, an interactive voice-responsive system located in a bank.

In the ESP market. ADSI capability opens the door to many potential display-based services, such as catalog shopping, home banking, entertainment reservations, and (combined with broadcast access) selection of pay television programs, as well as such information services as stock and weather reports.

The introduction of ADSI technology will offer ESPs substantial benefits. For example, it will:

(a) Improve overall service by helping to strengthen relationships with existing users, and to enlist new ones by delivering dial-up services through the public telephone network to a broader base than is possible through private access;

(b) Offer an additional service delivery vehicle, providing increased availability and cost benefits; and (c) Differentiate ESPs from competitors by providing services that are easier to use.

Now, with the present ADSI terminal operating companies and ESPs can immediately and cost-effectively introduce ADSI capability and enhanced services across the network.

For example, operating companies can rapidly deploy ADSI-based services using their existing copper-based infrastructures (loops) and in-hand signalling capabilities, thereby efficiently and cost-effectively evolving their networks to capitalize on the emerging enhanced services environment.

And, third parties can immediately deploy display-based enhanced services, such as home banking, by building on interactive voice-response systems already located in their premises.

Finally, ADSI services complement existing custom calling and custom local area signalling services (CLASS), also known as call management services (CMS).

To enable service providers to realize these benefits, the present and related inventions focus on three technology aspects:

(i) The creation of new display-based features;

(ii) The design of several signaling schemes, including a method for inband data transmission to an off-hook telephone (above-mentioned), and a technique to enable switches and servers to alternately deliver voice and data information: and (iii) The development of a virtual subscriber terminal (also termed customer premises equipment (CPE)) interface, which supports a wide range of display sizes, softkeys, keypads, and scroll keys.

Among features of the present invention are three advanced display-based applications. They are visual screening list editing, network call logging, and deluxe spontaneous call waiting identification (DSCWID) (also known as calling identity delivery on call waiting, with disposition). These ADSI capabilities complement existing custom calling and CLASS/CMS services.

Visual screening list editing enables subscribers on their ADSI terminal, to create and modify service lists, and turn features on and off, without having to reprogram the features. Subscribers to future ESP-based stock-market or sports-reporting services, for example, could set up personal profiles tailored for receiving specific information. They could also modify, these profiles easily on their own displays, without having to call a service provider.

Visual screening list editing will also allow users to view and edit directory numbers stored as lists in, for example, the DMS SuperNode (™) switch manufactured by Northern Telecom. By enabling subscribers to easily manipulate these lists to personalize their displays, this ADSI capability eliminates many of the difficulties associated with today's call-screening services which require users to follow voice prompts and memorize complicated codes to edit lists and access features.

By coupling visual screening list editing with CLASS/CMS call screening features—which include call waiting, selective call rejection, selective call forwarding, distinctive ringing, and selective call acceptance-subscribers can isolate certain incoming calls for special treatment, providing a measure of call-management control.

Network call logging assists in call completion by storing in a switch database (instead of in the terminal) the names and numbers of callers, as well as the times and dates of calls that arrive when subscribers are on the telephone or are not answering. Logging calls on the switch enables users to respond, with a press of a button, or calls (such as forwarded calls) that have not been displayed or logged by their own telephones.

Deluxe spontaneous call waiting identification (DSCWID) improves on the existing audible-tone-based call waiting feature by visually displaying the calling name and/or number of a second call during an ongoing telephone conversation. In addition, DSCWID gives recipients several softkey-driven ways of responding to the waiting party. Depending on the importance or the desirability of calls, subscribers can:

Redirect waiting parties to a voice-mail service;

Activate a "busy" message if the ongoing call is more important than the new call:

Provide a "please hold" message, if the ongoing conversation is nearing completion:

Answer the second call and toggle back and forth, for example, to relay information between callers: or End the first conversation and immediately connect to an urgent incoming call.

In order to support the above and similar features, the heretofore mentioned in-band data transmission to a terminal, and dual-mode signalling, were developed.

In-band data transmission to an off hook telephone, enables the switch to update the terminal's display with the call identification of a second incoming call or with ADSI service information.

Dual-mode signalling techniques enable the CO switch to alternately deliver voice or data information to an ADSI terminal across the conventional copper telephone lines.

Using in-band signalling, ADSI information (such as application and softkey definition data) is transmitted at a rate of 1200 bits per second, using the same type of signal that provides calling line identification. However, existing CLASS/CMS services transfer information only when handsets are on-hook because they are not designed to temporarily interrupt the voice path during data transmission. If data transmission were attempted without muting the voice path, the data would be corrupted by the user's speech and the burst would be loud enough to cause the user discomfort. Therefore, transmission to the other party is muted before the subscriber's display is updated. This interruption prevents either party from hearing the modem burst.

The ADSI protocol enables the switch to first send a signal to the terminal, alerting it that the burst is coming. In the ADSI standard, this signal is composed of two tones —2130 Hertz (Hz) and 2750 Hz—transmitted simultaneously for 80 milliseconds.

These frequencies can be isolated from voice because they are not among those generated by the dialpad, and do not occur frequently in conversation.

Dual-mode signalling enables ADSI telephones to receive many types of information-including display prompts, voice prompts and greetings, and data for enhanced telephony features, third-party applications, and softkeys. This is accomplished by providing two modes of operation; voice and data. The voice mode is optimized for services that use both audio and visual prompts, such as those supported by interactive voice-response systems. The data mode, on the other hand, is used for portions of applications where only data is displayed—for example, when a weather report service sends forecasts to a subscriber.

Because enhanced services can deliver many different types of data, the ADSI protocol allows multiple messages to be sent in the same data burst through the use of an encoding scheme similar to that used in calling line identification signalling.

A third mode, called feature down-loading, operates when the telephone is on-hook. This mode is similar to the data mode, except that it includes a mechanism for accessing the subscriber's display without ringing the telephone. Stored in the terminal, the information can be read by subscribers at their leisure.

The virtual CPE concept—which supports a range of display sizes, softkeys, keypads and scroll keys—provides multivendor capability by maintaining a generic interface to the network and severs. After a service writes display or command software to this generic display area, the ADSI protocol maps this information onto the actual telephone display. The ADSI protocol requires that all ADSI terminals adhere to this same virtual interface. This will allow various vendors to design terminals with different display sizes, yet support the same services.

The ADSI virtual CPE consists of three components: a virtual display, a virtual softkey table, and terminal control functionality.

The virtual display includes two pages: an information page and a communication page. The information page-two columns, 20 characters wide by 33 lines deep-allows the terminal to store a block of data, such as callers' names and numbers, for the user to scan. The communication page (the same width by four lines deep) stores transient messages, such as prompts. This page is implemented separately to avoid overwriting the service-specific information page with procedural data.

Information for these two virtual pages can be downloaded to the telephone in a single transmission burst. The pages can then be partitioned in the terminal to suit the physical display. In the present preferred ADSI terminal, for example, the pages are partitioned to fits its 20-character-wide screen. In addition, the virtual pages can be divided vertically into multiple display "windows" on the actual terminal.

The virtual softkey table stores softkeys separately from the virtual display information. This table provides, on a per-session basis, a pool of 32 redefineable softkeys for each service. In the table, six softkeys can be assigned for each display line, and no two lines are required to have the same softkey. This flexibility allows the softkeys to be context-sensitive. The virtual softkey table contains:

A softkey definer—a single number that provides an index to the softkey table;

Softkey labels—such as erase, exist and dial-which are ASCII character fields that provide visual descriptions of the current softkey function; and A return string, which is an ASCII character field acted upon when a softkey is pressed, indicating the terminal's response, such as on-hook, flash, dial-tone detect, or dual-tone multifrequency dial.

Terminal control functionality is composed of physical and display control functions. The physical control function disables and enables the handset, keypad, and softkeys. The display control functions determine the information to be shown, and how it should be displayed. For example, the cursor control function can move the characters on the screen from left to right, or in the reverse direction.

Accordingly, the present invention provides an interactive subscriber telephone terminal, comprising: a display screen; a plurality of temporarily definable response/data entry keys; and local control means for selectively causing said display screen and/or said response/data entry keys to be controlled by one of: remote signals transmitted to the terminal from a telephone switching office, and said local control means.

BRIEF DESCRIPTION OF THE DRAWINGS

The preferred embodiment of the invention will now be described in detail in conjunction with the annexed drawings, in which.

DETAILED DESCRIPTION OF THE PREFERRED EMBODIMENT

Figure 1:
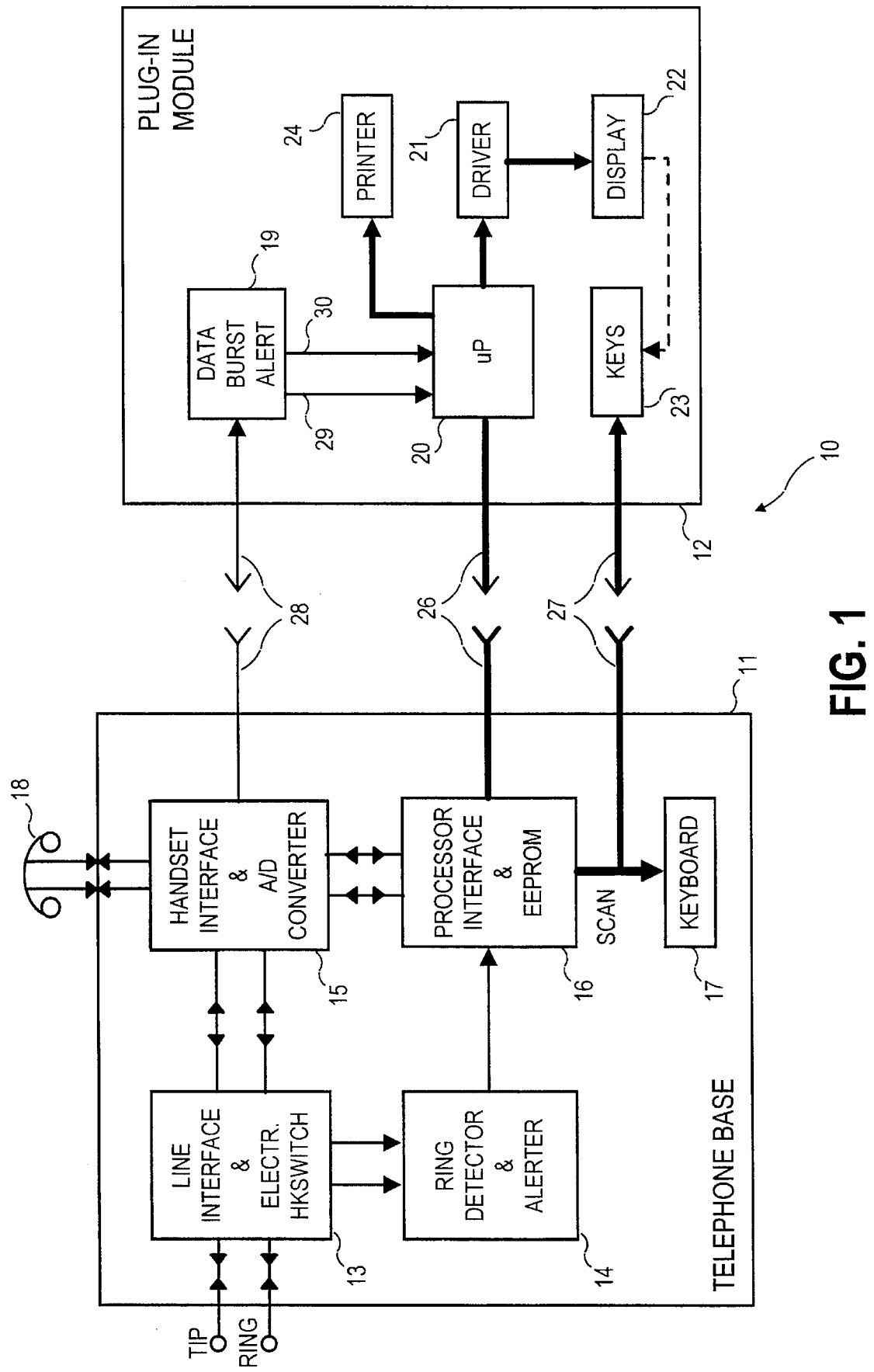
FIG. 1 is a block schematic of an ADSI subscriber terminal according to the present invention.

FIG. 1 of the drawings shows a block schematic of Analog Display Services Interface (ADSI) subscriber terminal 10, which comprises telephone (or terminal) base 11 and plug-in module 12. The base 11 connects to the TIP and RING of the telephone line connecting it to the central office (CO) of the telephone company. The base 11 comprises a line interface and electronic hook switch circuits 13, ring detector and alerter circuits 14, handset interface and analog-to-digital (A/D) convertor circuits 15, processor interface and EEPROM circuits 16, and standard touch-tone telephone keypad 17. A handset 18 is, of course, part of the standard telephone components or the base 11. The ADSI plug-in 12 comprises a data burst alert circuit 19, a microprocessor 20, a LCD display driver 21, a LCD display 22, softkeys (redefinable keys) 23 adjacent the display 22, and a printer (or printer port for an external printer) 24. Normally, the keys 23 will also include hard-keys such as scrolling cursor keys 25 and so on (as shown in FIG. 2).

Figure 2:
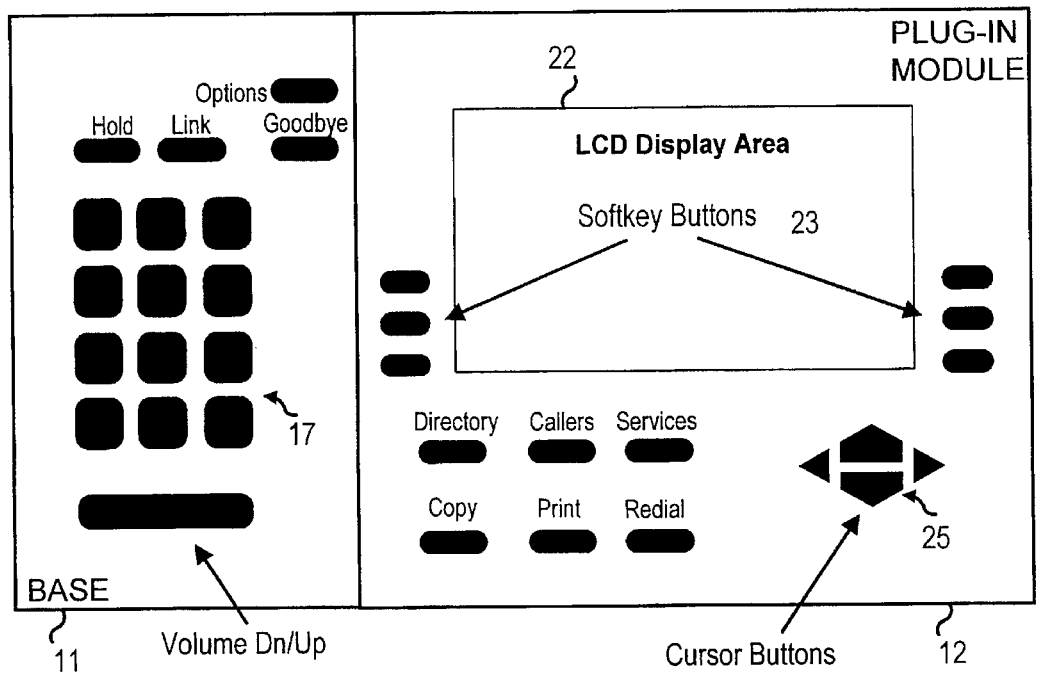
FIG. 2 is a pictorial drawing depicting the front of the subscriber terminal as accessed by a user.

Referring also to FIG. 2, it shows the user-visible front of the ADSI terminal 10. The module 12 plugs into the base 11 and connects to the latter by means of two buses 26 and 27, the former being the processor bus, and the latter for scanning the keys 23. The data burst alert 19, which comprises two switched-capacitor filters for detecting two pre-burst tones, receives signals through the interface 15 via connection 28. The sole function of the alert circuit 19 is to tell the processor 20 by means of high-tone and low-tone leads 29 and 30 that a data burst will follow.

Figure 3:
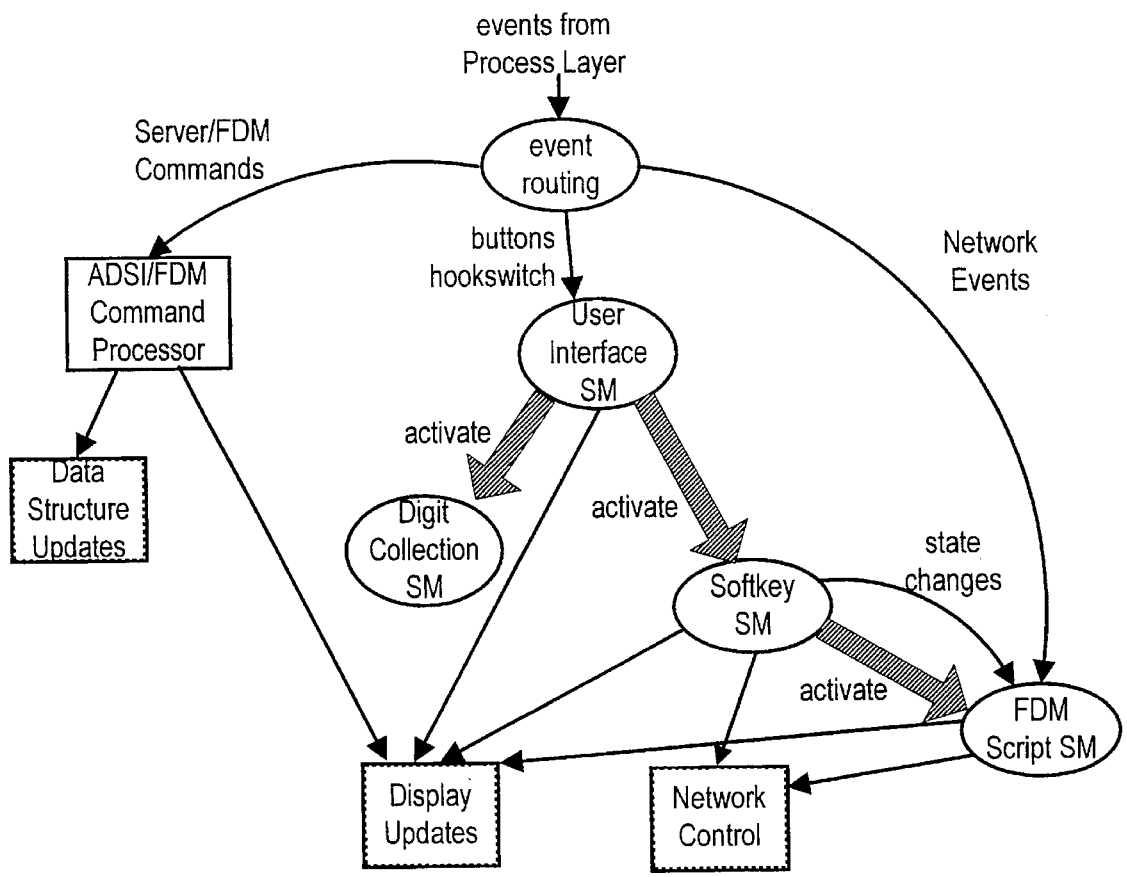
FIG. 3 is a diagrammatic summary of state machine (SM) interactions underlying the ADSI terminal and telephone network interactions.
Figure 4:
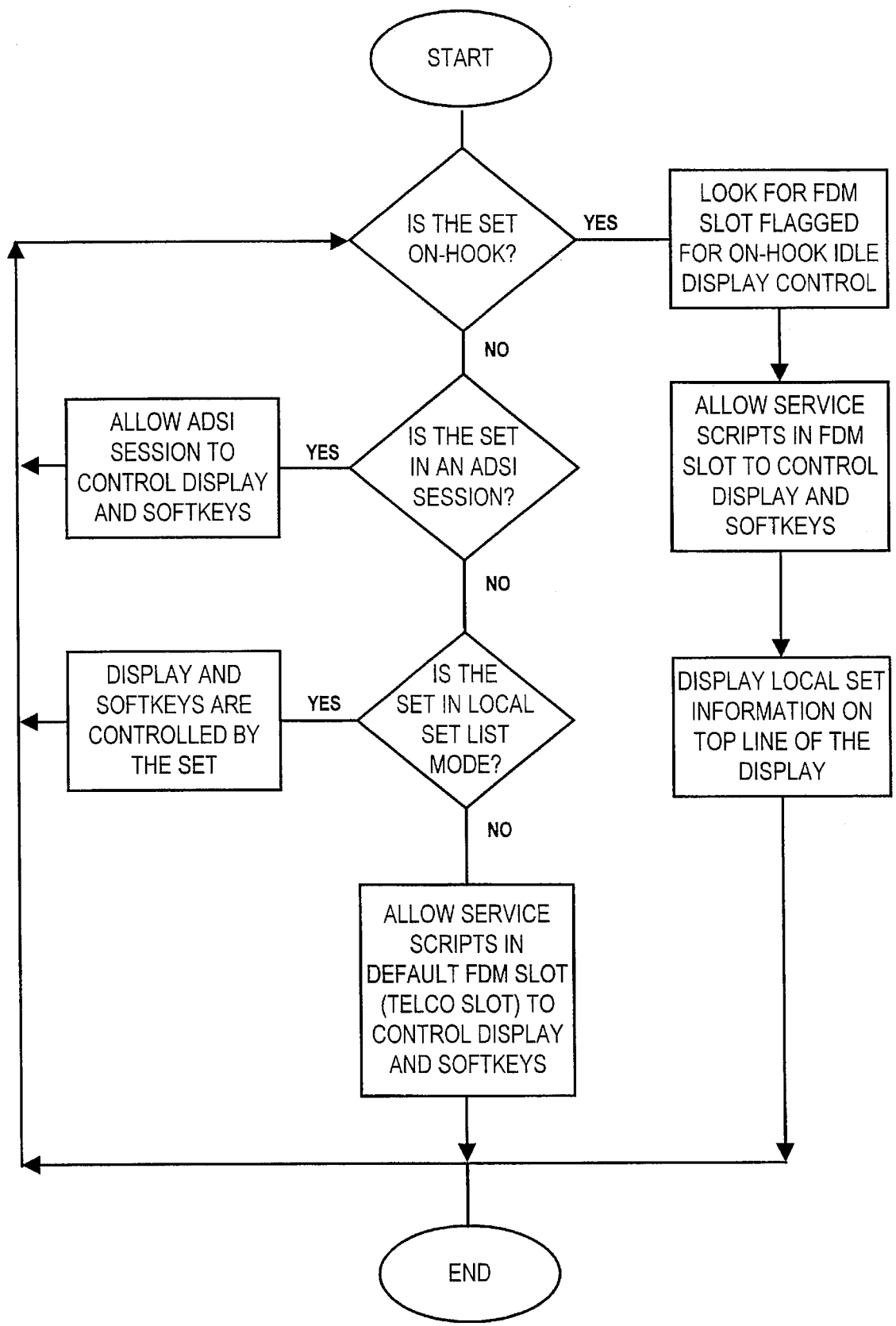
FIG. 4 is a flow-chart defining the three modes of control of the display and softkeys of the ADSI terminal.

Turning now to FIGS. 3 and 4, the ADSI/Telephone Network interface layer is shown. There are four essential sub-systems:

ADSI/FDM (Feature Download Management) Command Processor;

ADSI User Interface State Machine (SM);

Softkey Return String (Script) Interpreter SM; and

FDM Service Script Interpreter SM.

The ADSI/FDM command processor accepts control events from the ADSI process layer, and is only required to update data structures and/or ADSI display components. Examples of ADSI server and ADSI FDM commands are:

ADSI server:
    Initialize softkey line
    Line Control
    Information
    Disconnect Session
    Switch to Data
    Input Control
    Switch to Peripheral
    Load Default Softkey Tuple
    Connect Session
    Display Call Buffer
    Clear the Screen ADSI FDM:
    Load CPE Script Softkey Table
    Load Predefined Display
    Load Script
    Download Connect
    Download Disconnect The ADSI User Interface state machine (UISM) processes all remaining events of interest, routing them as appropriate to the softkey script or service script interpreter state machines. It maintains some of the state information for each of the associated state machines, and coordinates any communications between them. An additional sub-task of this state machine is to provide a digit collector mechanism.

The UISM activates and modifies the softkey state machine (SKSM) by routing softkey or cursor events to it. Only one invocation of an SKSM will ever exist at any one time. Even when a sub-script is specified, it is not executed until after the current script has been completed. Practically speaking each invocation of the SKSM has a short life. It lives only until the end of the script or until the user goes on-hook, with virtually every command being immediately executable. The only exception is "Dial Tone Detect", which has a 3 second time-out.

The FDM Service Script state machine (FSSM) is activated by softkey events when the FDM UI state is active, as determined by the UISM. Network, timer, hookswitch and softkey script events may modify the sequence of a service script and the state of the FSSM. As with the SKSM, only the service script may be active at one time, however, many sub-scripts may be nested so the FSSM must maintain state information for every level of sub-script.

The ADSI terminal user interlace is always under the control of the ADSI server application. In general the terminal is not required to interpret user actions. When in an ADSI session, the terminal display is modified either by direct commands from the server, or through predefined softkey return string instruction sequences or scripts. Scripts come in two types, softkey return strings and service scripts, both of which have previously been downloaded to the terminal.

Softkey scripts are executed by the softkey script interpreter, which, among other things controls the display components and network interfaces, and raises service script events. Softkey scripts run to completion and respond to no control stimulus other than a handset on-hook event, which causes the script to abort.

Service scripts are executed whenever a user presses softkeys associated with one of the services presented the FDM (Feature Download Management) display. These scripts also control the display components and network interfaces as well as invoking subscripts, etc. The state of the service script interpreter is controlled by physical events such as "caller ID received", "busy tone detected", "handset off-hook" etc.

In the course of using ADSI services, subscribers typically respond to prompting messages and control the flow of application information to their terminal displays by pressing softkeys. Softkeys change their function depending on the service requested. New functions are indicated by display-based (user friendly) labels downloaded from a switch or server either during or at the start of an interactive session.

Softkeys are stored separately from the ADSI information page in a virtual softkey table. This table provides, on a per-session basis, a pool of 32 redefinable softkeys for each service.

The virtual softkey table contains a softkey definer, which provides an index to the softkey table: softkey labels, which visually describe the current softkey function; and return strings, which indicate the terminal's response to the softkey. For example, by pressing a softkey labelled "Erase ", the user could activate a dual-tone multifrequency 2 (DTMF 2, or touch-tone) signal to instruct the switch or server to delete a previously entered display line. Softkey labels are user comprehensible and must correspond to the following softkey return string command:

| COMMAND | DESCRIPTION |
| --- | --- |
| DTMF | Transmit the characters using DTMF |
| Encoded DTMF | Transmit the following characters using DTMF encoding |
| On Hook | Open switch-hook |
| Off Hook | Close switch-hook |
| Flash | Flash switch-hook |
| Dial Tone Detect | Wait for dial tone detection (up to 3 seconds) |
| Line Number | Return current line number using encoded DTMF |
| Blank | Do not send anything back to server |

-continued

| COMMAND | DESCRIPTION |
| --- | --- |
| Send Characters | Send the collected characters/digits |
| Clear Characters | Clear the collected characters/digits |
| Backspace | Erase the last character collected |
| Tab Field | Tab the current line to the following subfield |
| Goto Line | Go to the following page and line number |
| Goto Line Relative | Go up/down to the line relative to the current line |
| Page Up | Go up one page |
| Page Down | Go down one page |
| Extended DTMF | Send 250 msec tones instead of 60 msec |
| Delay | Delay for the specified number of 10 msec counts |
| Dial Pulse One | Send a dial pulse one |
| Switch to Data | Switch the terminal to Data mode |
| Switch to Voice | Switch the terminal to Voice mode |
| Display Call Buffer | Display the specified call buffer |
| Clear Call Buffer | Clear the specified call buffer |
| Enable/Disable Flags | Enable or Disable the specified information flags |
| Clear Display | Clear the terminal physical display |
| Display String | Display the specified predefined string |
| Soft Key | Display the specified softkey |
| State Change | Change the state of the active service script |
| Timer Function | Start or clear a timer |
| Flag On/Off | Turn a service script flag on or off |
| Overlay | Overlay the specified sub-script |
| Event 22 Trigger | Trigger service script event 22 |
| Event 23 Trigger | Trigger service script event 23 |
| Exit | Exit the service script interpreter |

Service script events are events such as "caller ID received", "timer expired", "extension telephone in use detected", "busy tone detected", and so forth.

Service slots which can be reversed for specific scripts via factory programming of the Feature Download Numbers (FDN) and security codes, as well as Services list locations, into module EEPROM. The factory programming also includes the capability to individually lock each script from being suspended (i.e. made non-executable) —Suspend bit, and individually lock each script from being deleted (i.e. overwritten by another script) —Lock bit.

Script state can be changed by the user (subject to factory programming of the suspend and lock bits) through the Services list. If there is no script loaded into a slot, the <available> prompt will be displayed in the Services list. When a script slot is empty, no other soft-keys are displayed when the cursor is beside the <available > prompt.

A script that has been loaded but is not executable will be displayed in the Services list by showing the script name but not displaying a Select soft-key when the cursor is beside the script name. This state occurs whenever factory programming of FDN # and Security code is done for a slot but no script has yet been downloaded, or when a script was executable but an error was found in the script when it was last executed. The following management soft-keys will appear beside the script name depending on factory programming: the Delete soft-key will appear if the script is deleteable (Lock bit not set) or suspendible (Suspend but not set); and, no soft-key will appear if both the Lock and Suspend bits are set.

A script that is executable by the Select soft-key (or by appropriate events/states for the Advanced Call Management Services (ACMS) and Display Based Marketing (DBM) scripts) will appear in the list as a Script name, with the Select soft-key visible when the cursor is beside the script name. The same management keys will appear as in the Loaded but not Executable state shown above.

A script that has been suspended from execution but cannot be deleted (lock bit factory programmed to not allow script to be deleted) will appear with <suspended> replacing the script name, with the Restore soft-key visible when the cursor is beside the <suspended> script prompt.

A script that has been suspended from execution and can be deleted (lock but not set) will appear with <deleted> replacing the script name, with the Restore soft-key visible when the cursor is beside the <deleted> script prompt.

No script information is stored into memory until a valid FDM connect followed by data followed by a valid FDM disconnect is received by the V350. The user is given the option of accepting or rejecting the script download with soft-keys.

Updating a script means that a newer version of a portion or all of an existing script is to be downloaded to the phone. IF the FDN # and Security code match THEN any portion of a script which is downloaded (Script, Soft-keys, Displays) will replace the existing portion of the script. This allows for "partial" downloads to be done where only 1 element of the script is updated.

Overwriting a script means that a different script will completely overwrite an existing script IF THE FDN # matches AND Security code does not match AND the script is currently in <deleted> state in the Services list THEN the script memory is cleared and the new script is overwritten into memory; and, an entire script consisting of Script, Soft-keys and Displays must be downloaded or the script will not be executable. IF the FDN # does not match THEN look for an <empty> or <deleted >slot to overwrite the script into: the script memory is cleared and the new script is overwritten into memory; and, an entire script consisting of Script, Soft-keys and Displays must be downloaded or the script will not be executable.

A user initiated download will be refused IF the FDN # matches AND Security code does not match AND script is in either Executable state OR Suspended state; and, IF the FDN # does not match AND there are no <empty> or <deleted> slots. IF the FDN # and Security code match THEN allow partial download as in Outgoing call case. IF the FDN # and/or Security code do not match THEN refuse download.

A Telco script is one which starts automatically whenever the set receives an incoming call or initiates an out-going call. It is used to assist the customer with switch feature interactions such as DSCWID, Call Forwarding, 3-Way Calling etc. by providing context sensitive soft-keys and display prompts.

Figure 5:
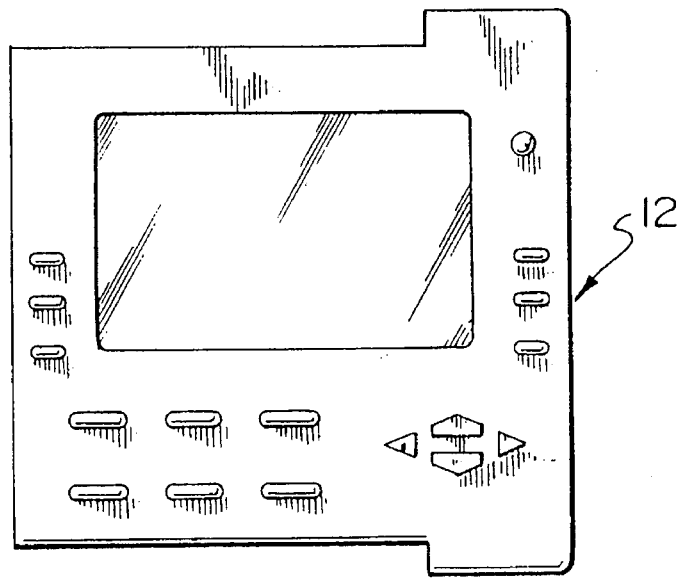
FIG. 5 is a pictorial of the front of the plug-in module of the ADSI terminal depicting it in use when in an interactive session.

FIG. 5 illustrates the terminal in an interactive session with a stockbroker service provider. The ADSI protocol supports terminals of different manufacture and display sizes by maintaining a generic software "image" in the terminal memory. After a service writes information to this "virtual" display area, the ADSI protocol maps it onto the actual terminal display. Shown below is a typical virtual display information page—two columns of data, 33 lines deep. In this case, the data supports a stock-quotation service. Each column fits the screen of the ADSI terminal. The left column provides for menus and major service information; the fight column supports additional stock-quotation information. Users can toggle between columns by pressing the terminal's left/right scroll buttons. To accommodate various service-list and menu depths, the columns can be divided horizontally into multiple display "windows", which are separated by "breaks" programmed into the service. The display also contains softkey labels, which are downloaded from the switch or server to help users control lists and menus and activate services.

| | Virtual Display Information Page | | | |
|---|---|---|---|---|
| 1 | Welcome to | | | |
| 2 | Personal stock quote | | | |
| . | | | | |
| . | | | | |
| . | | | | |
| | (Break) | | | |
| | Select an action: | | | |
| | 1. View portfolio | | | |
| | 2. Browse market | | | |
| | 3. View performance | | | |
| | 4. Change portfolio | | | |
| | 5. Request info. | | | |
| | 6. Talk to broker | | | |
| | 7. Change password | | | |
| | (Break) | | | |
| | Personal portfolio: | | Dated 08/22/94 | |
| | Name: | Close: | +/−: | '94 Low | '94 High |
| | ABC Ltd. | 34.8 | −0.2 | 28.7 | 35.5 |
| | 1st Bank | 21.6 | +1.3 | 20.2 | 21.7 |
| | QCola | 2.3 | −7.9 | 2.3 | 28.1 |
| | (Break) | | | |
| . | Personal performance | | | |
| . | 1. Today's stats. | | | |
| . | 2. 1994's Stats. | | | |
| . | 3. Weekly stats. | | | |
| 33 | 4. Total Stats. | | | |

Figure 6:
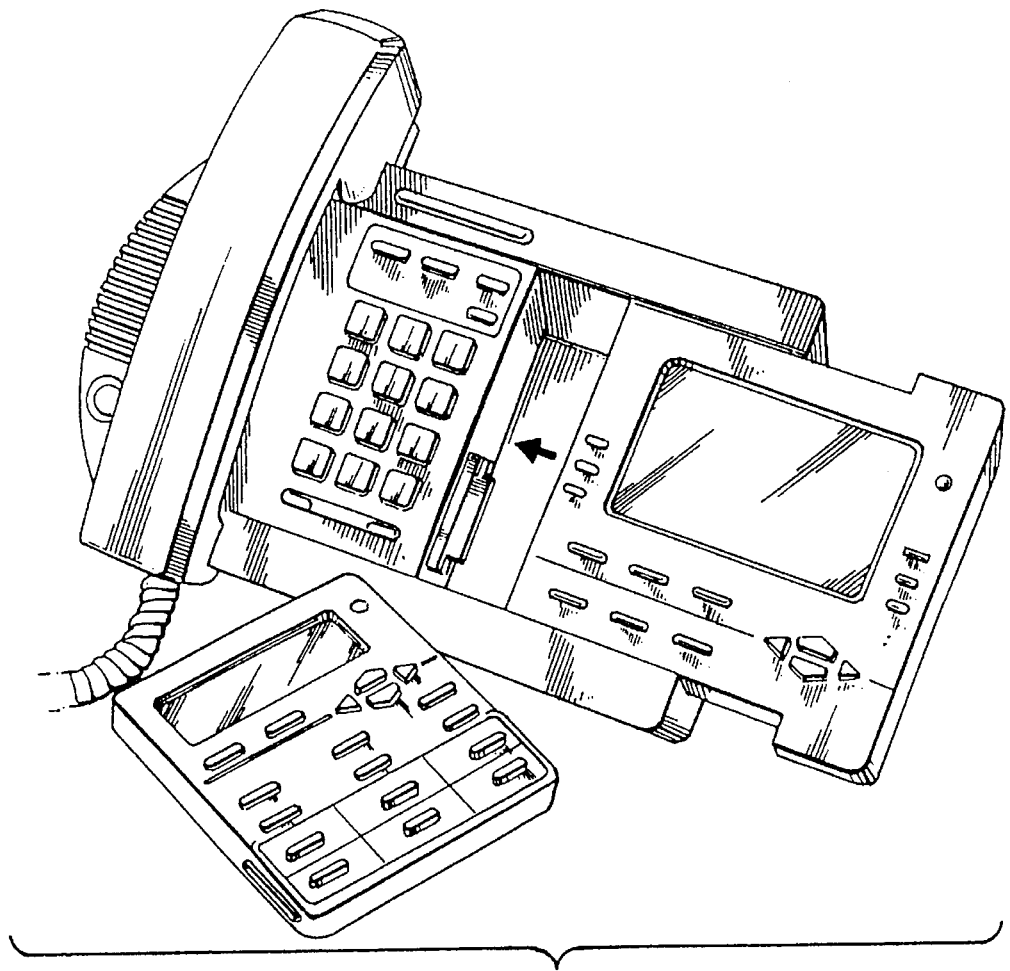
FIG. 6 is a perspective view of the terminal during interchange of plug-in modules.
Figure 7:
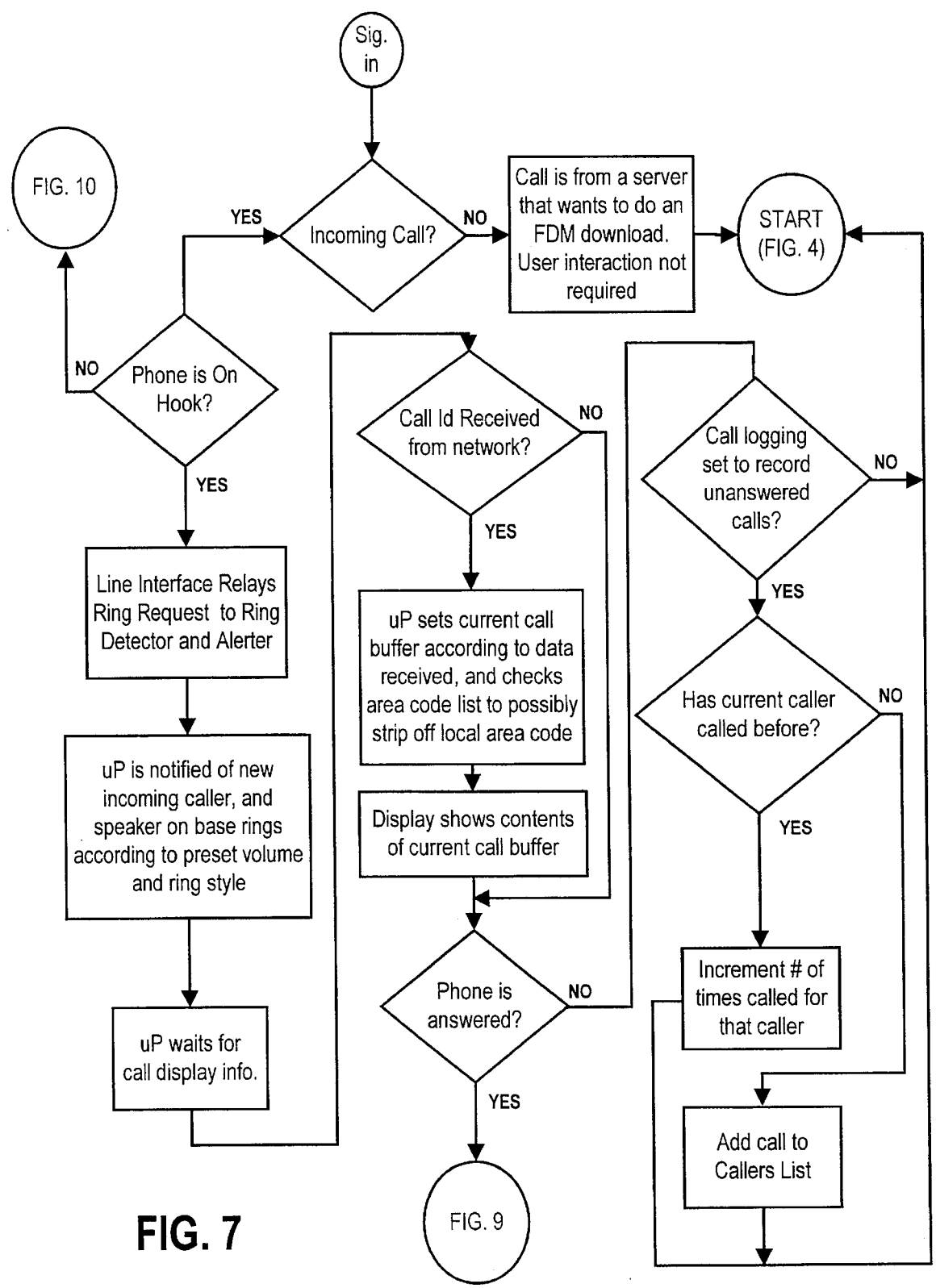
FIG. 7 is a flow-chart showing how the subscriber terminal handles an incoming call.
Figure 8:
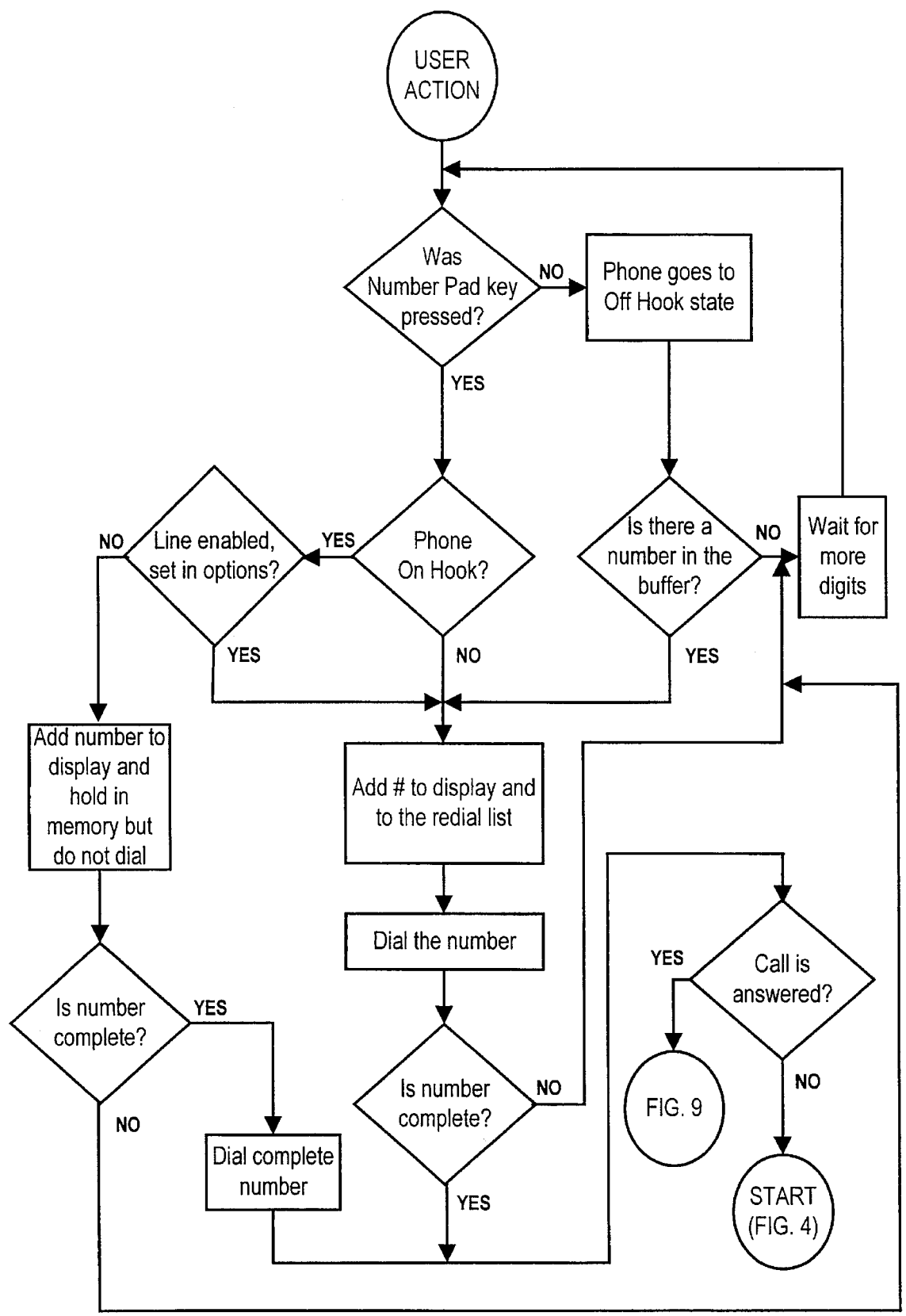
FIG. 8 is a flow-chart showing how the subscriber terminal handles user initiated action.
Figure 9:
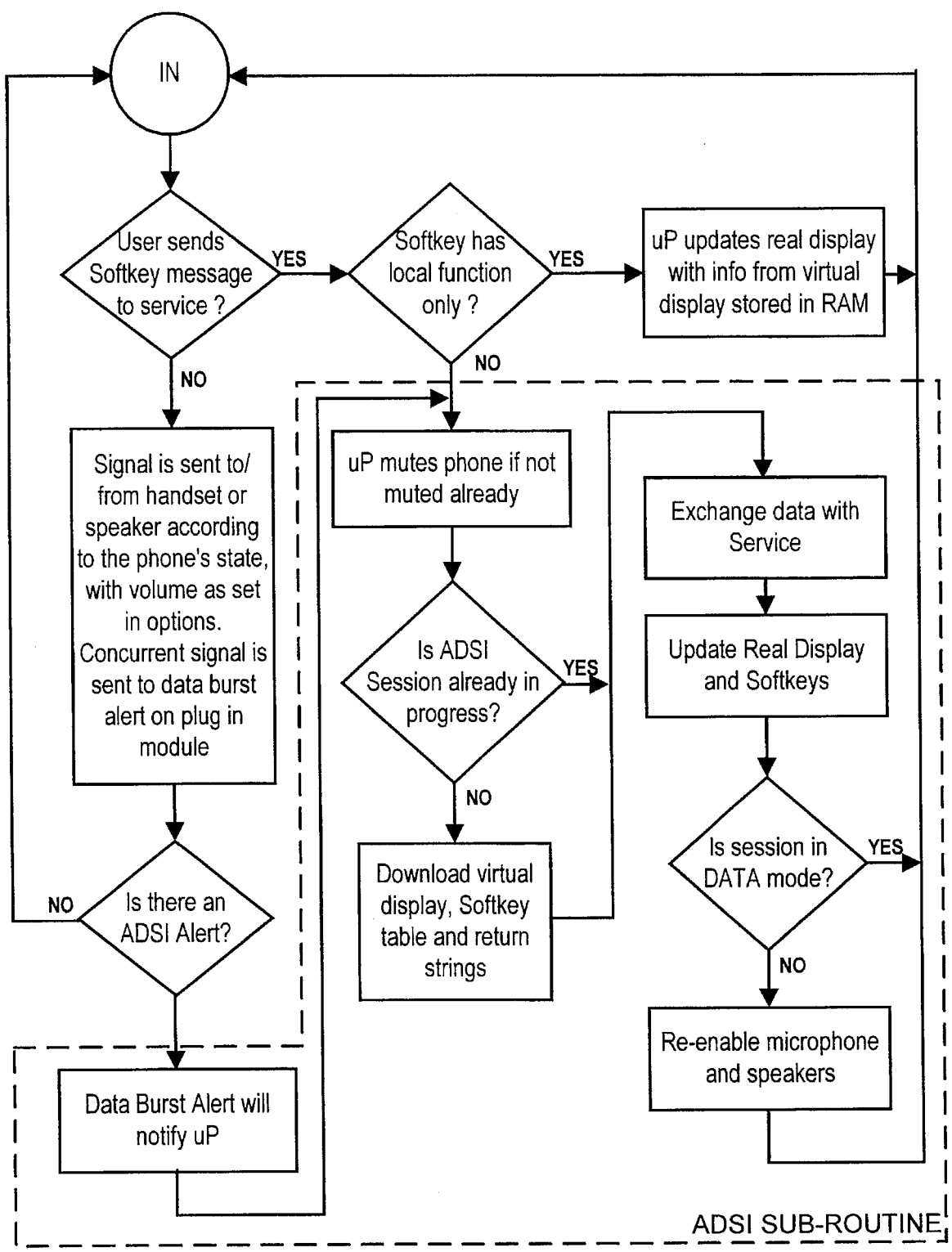
FIG. 9 is a flow-chart showing how the subscriber terminal handles incoming or user initiated activity while the terminal is active off hook.
Figure 10:
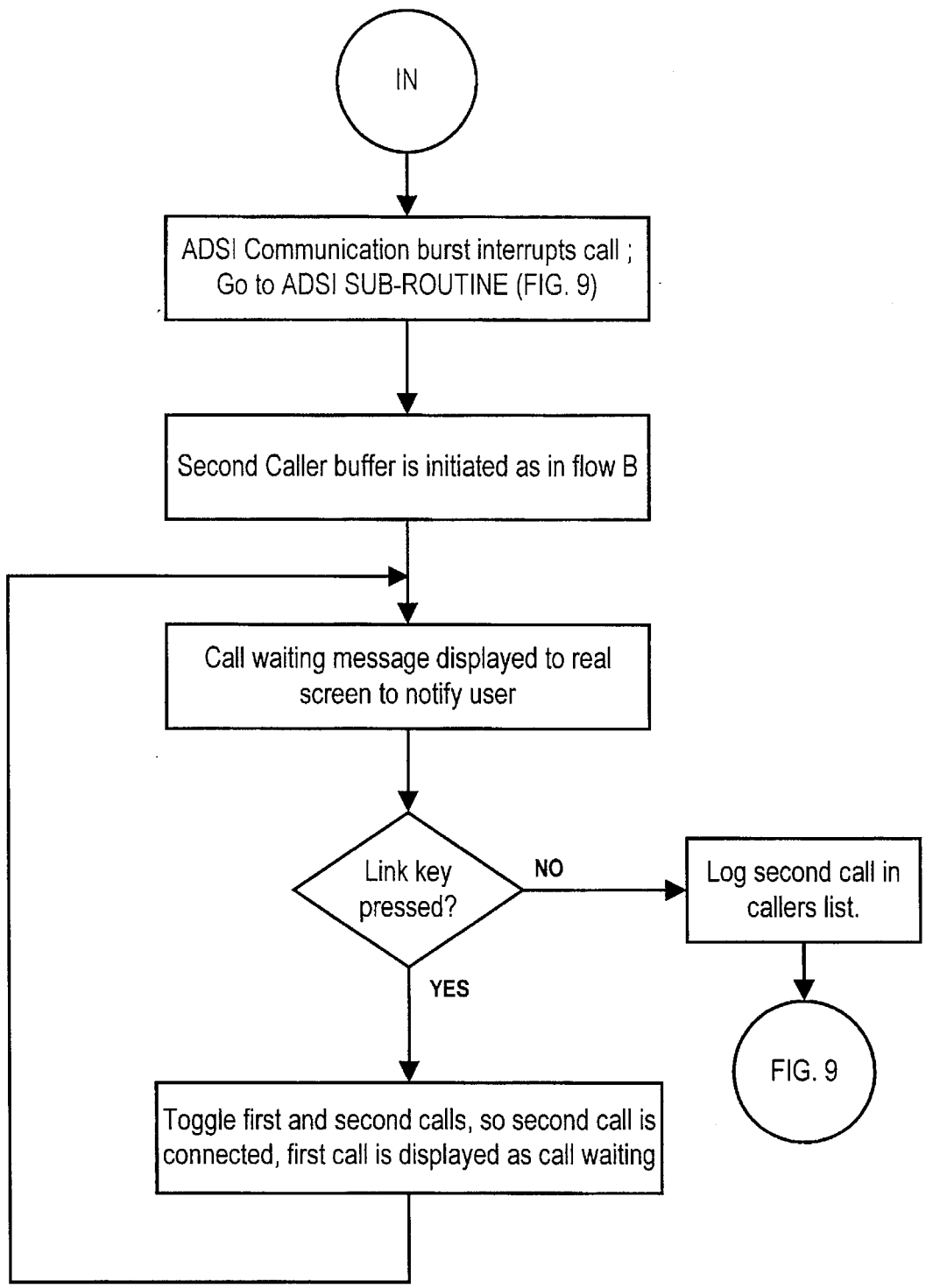
FIG. 10 is a flow-chart showing how the subscriber terminal handles call-waiting routines.
Figure 11:
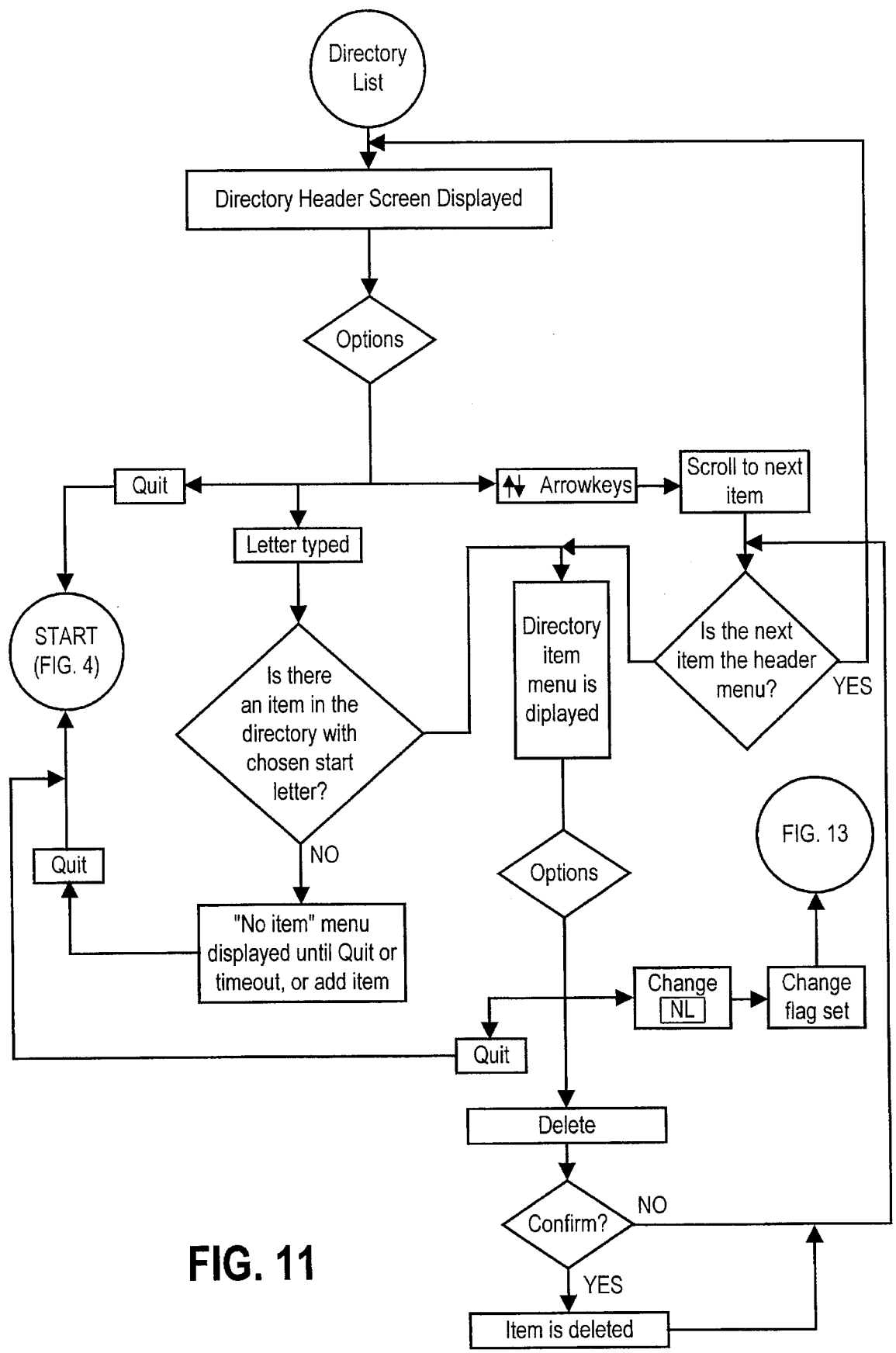
FIG. 11 is a flow-chart showing how the subscriber terminal controls its internal directories.
Figure 12:
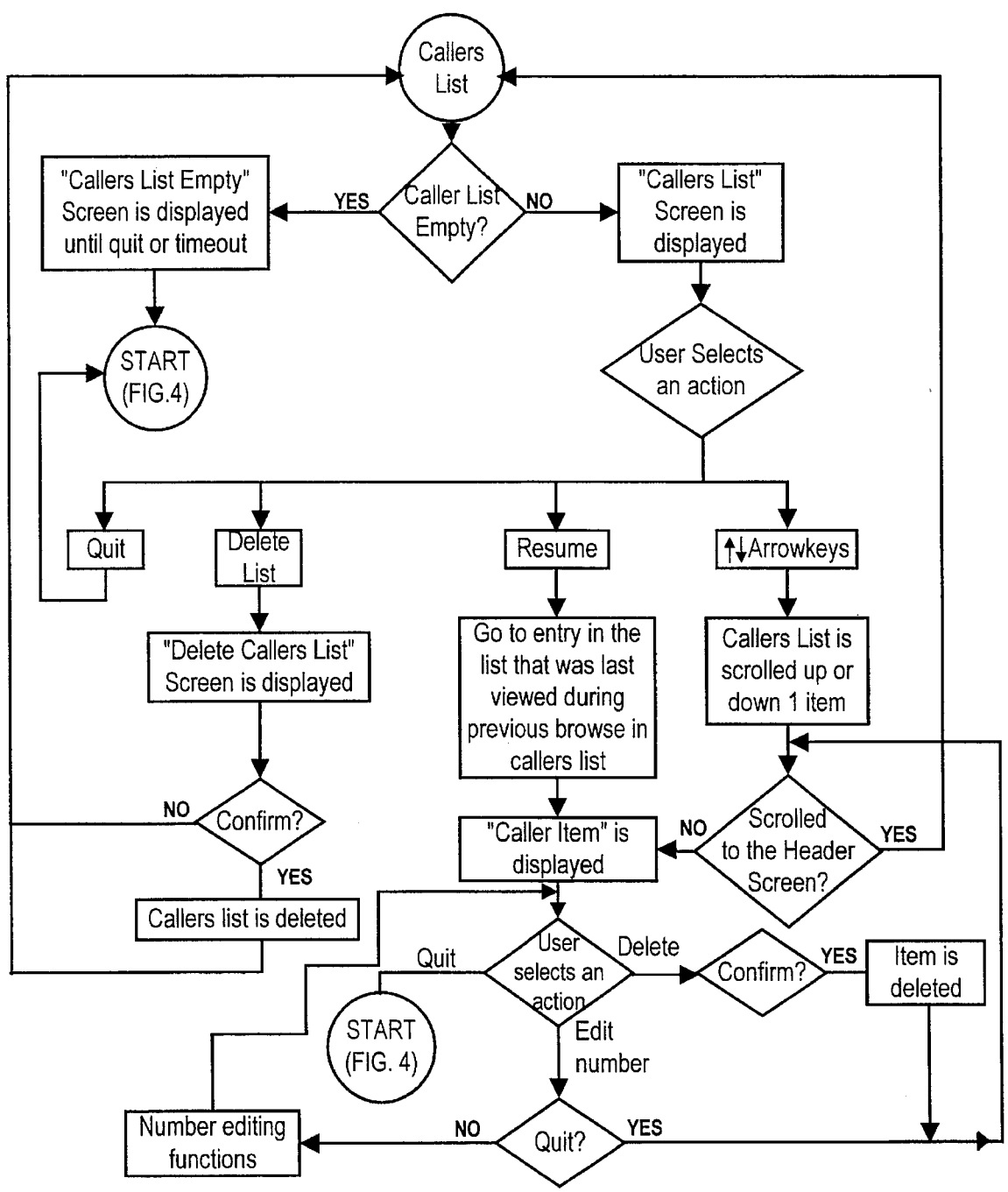
FIG. 12 is a flow-chart showing how the subscriber terminal controls its internal "Callers" directory.
Figure 13:
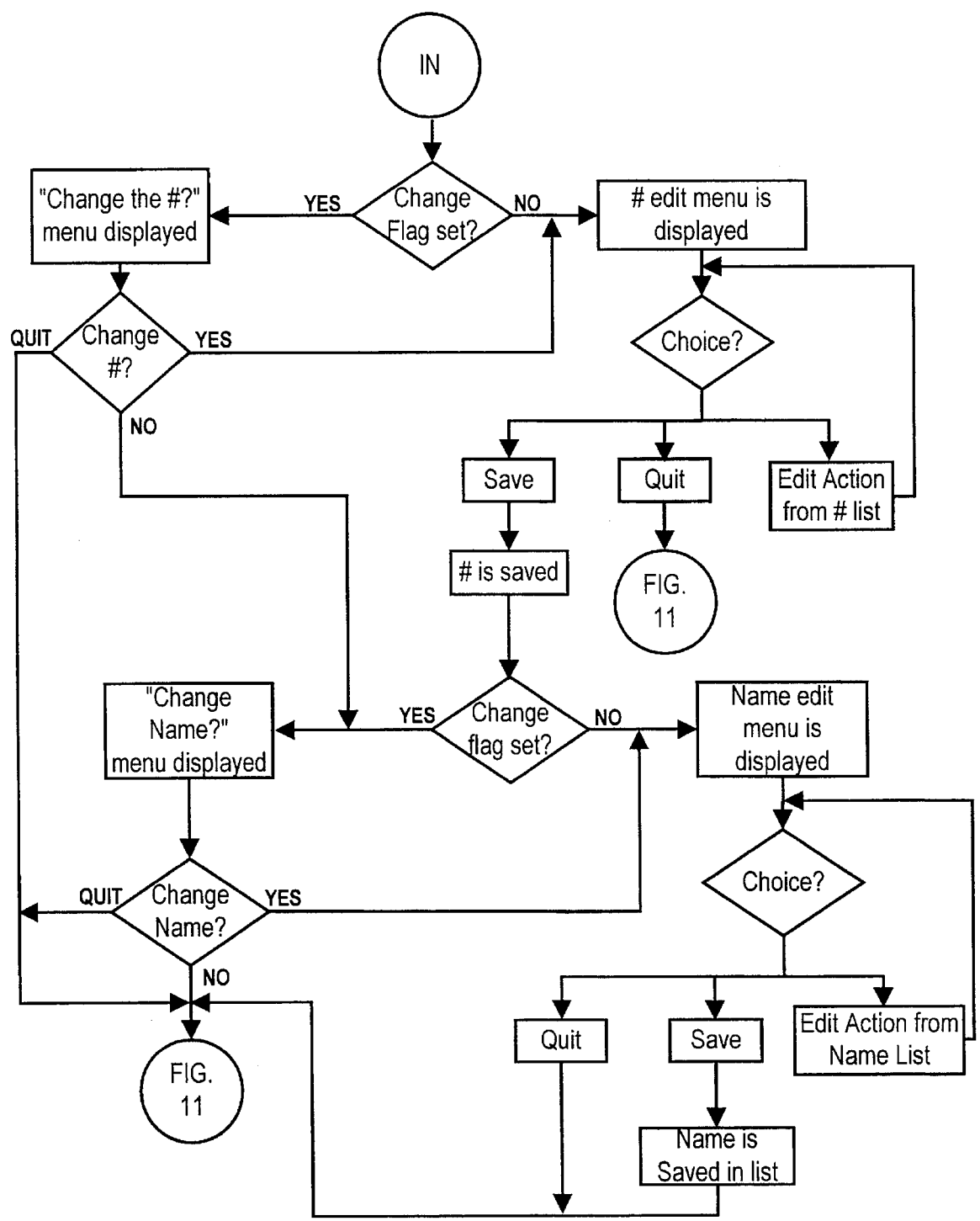
FIG. 13 is a flow-chart showing how the subscriber terminal interacts with a user to manipulate an internal directory.
Figure 14:
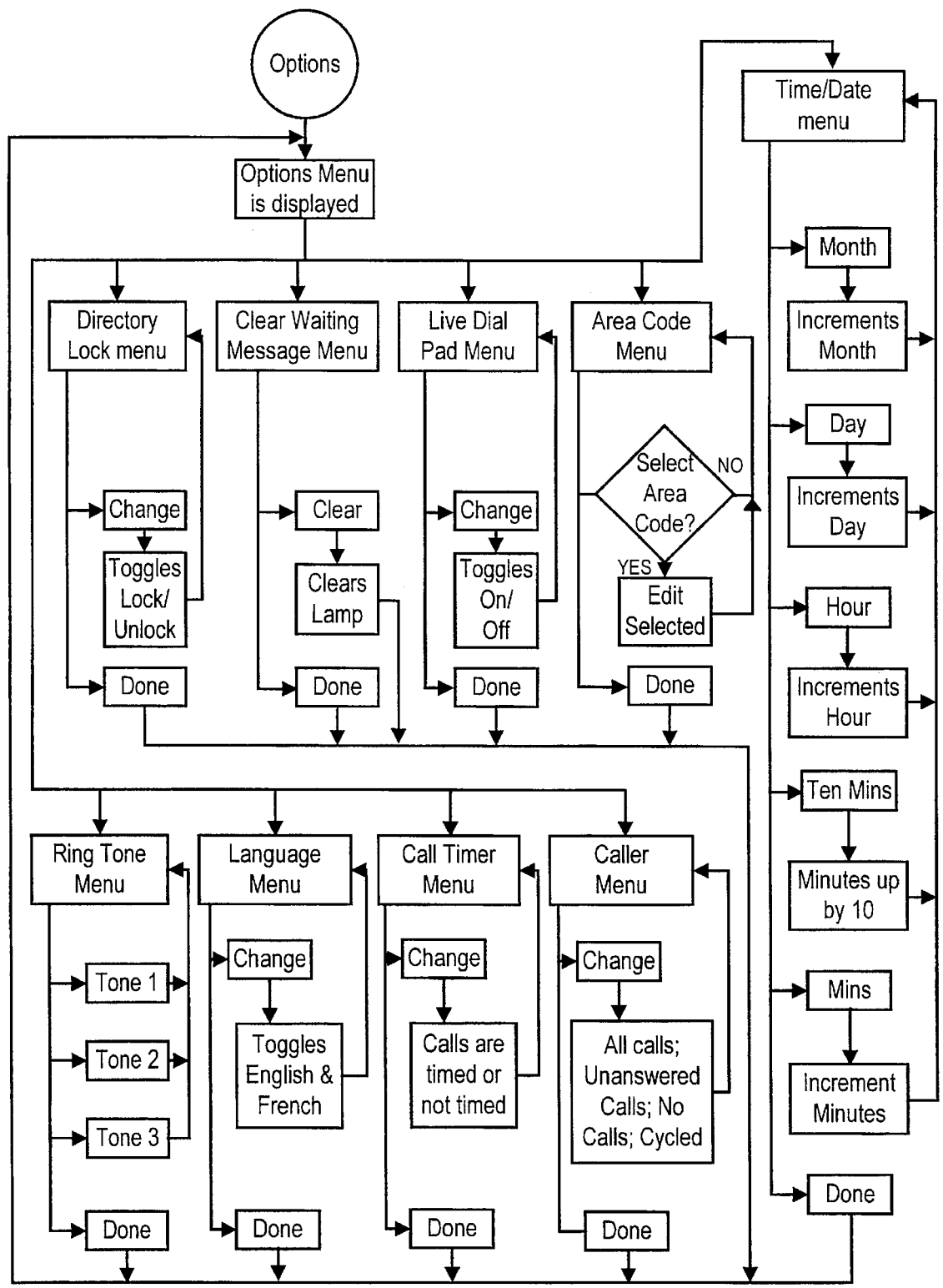
FIG. 14 is an organizational chart showing the internal options directory of the subscriber terminal.
Figure 15:
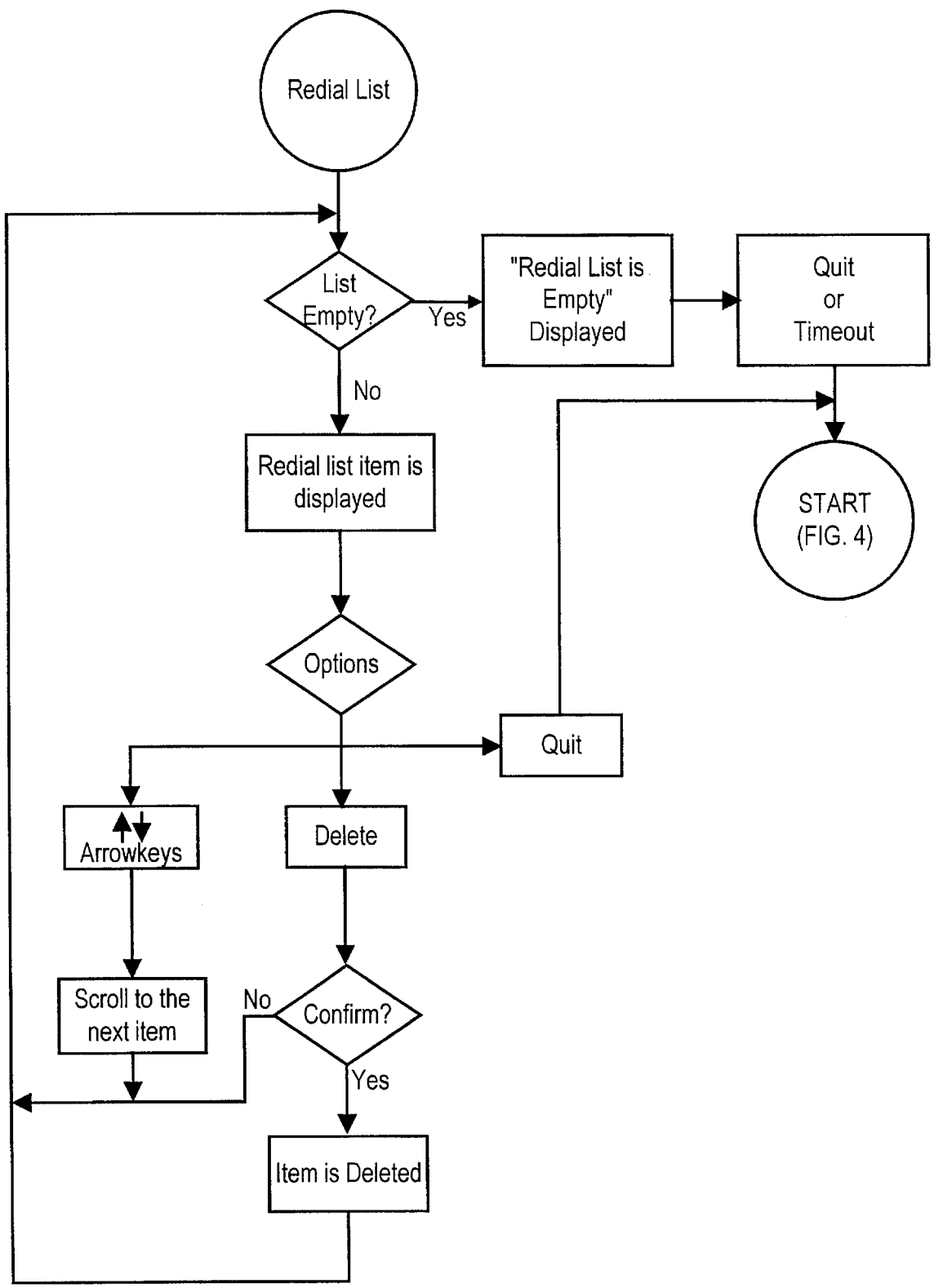
FIG. 15 is a flow-chart showing the "Redial" subroutine.
Figure 16:
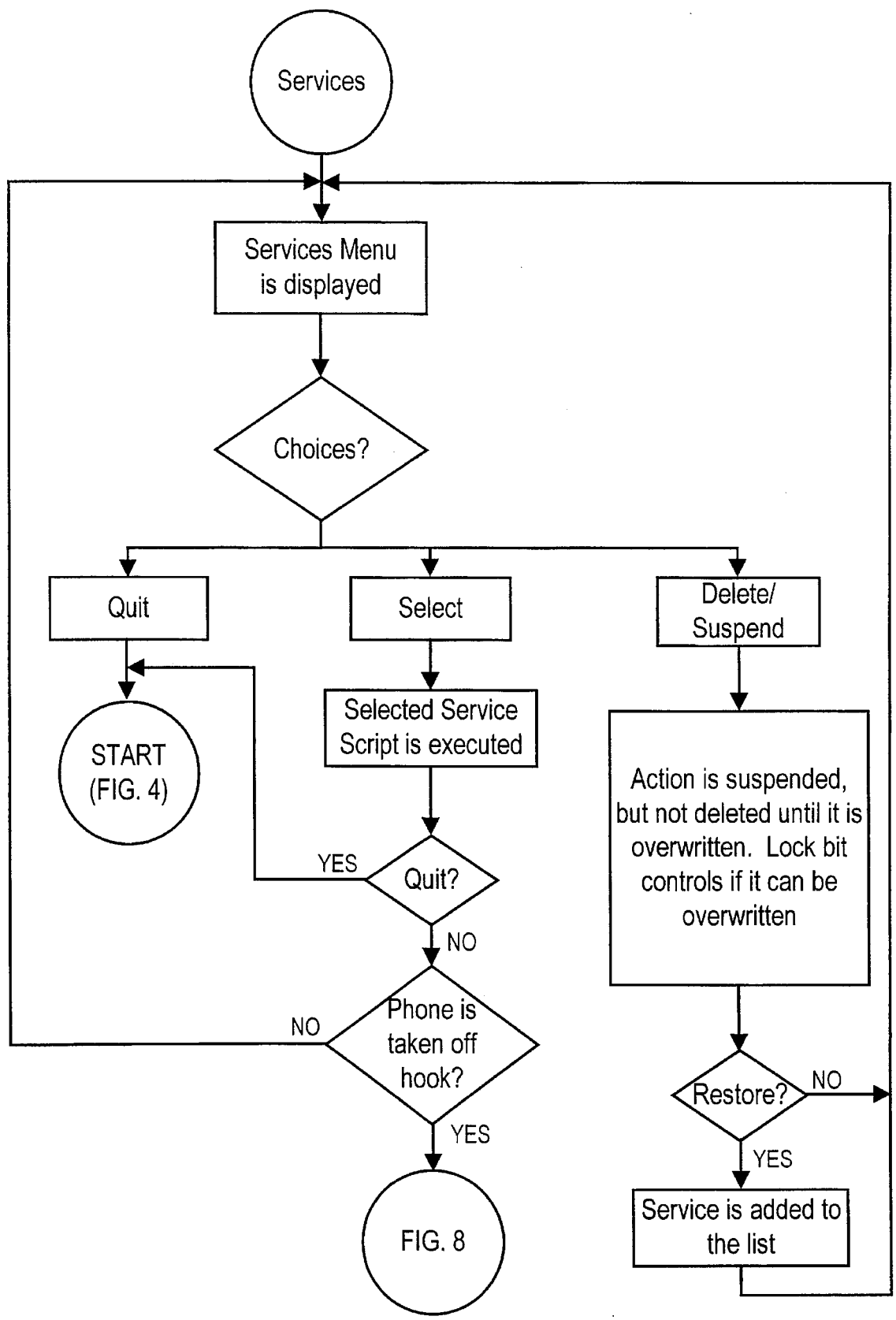
FIG. 16 is a flow-chart showing the "Services" directory subroutine.
Figure 17:
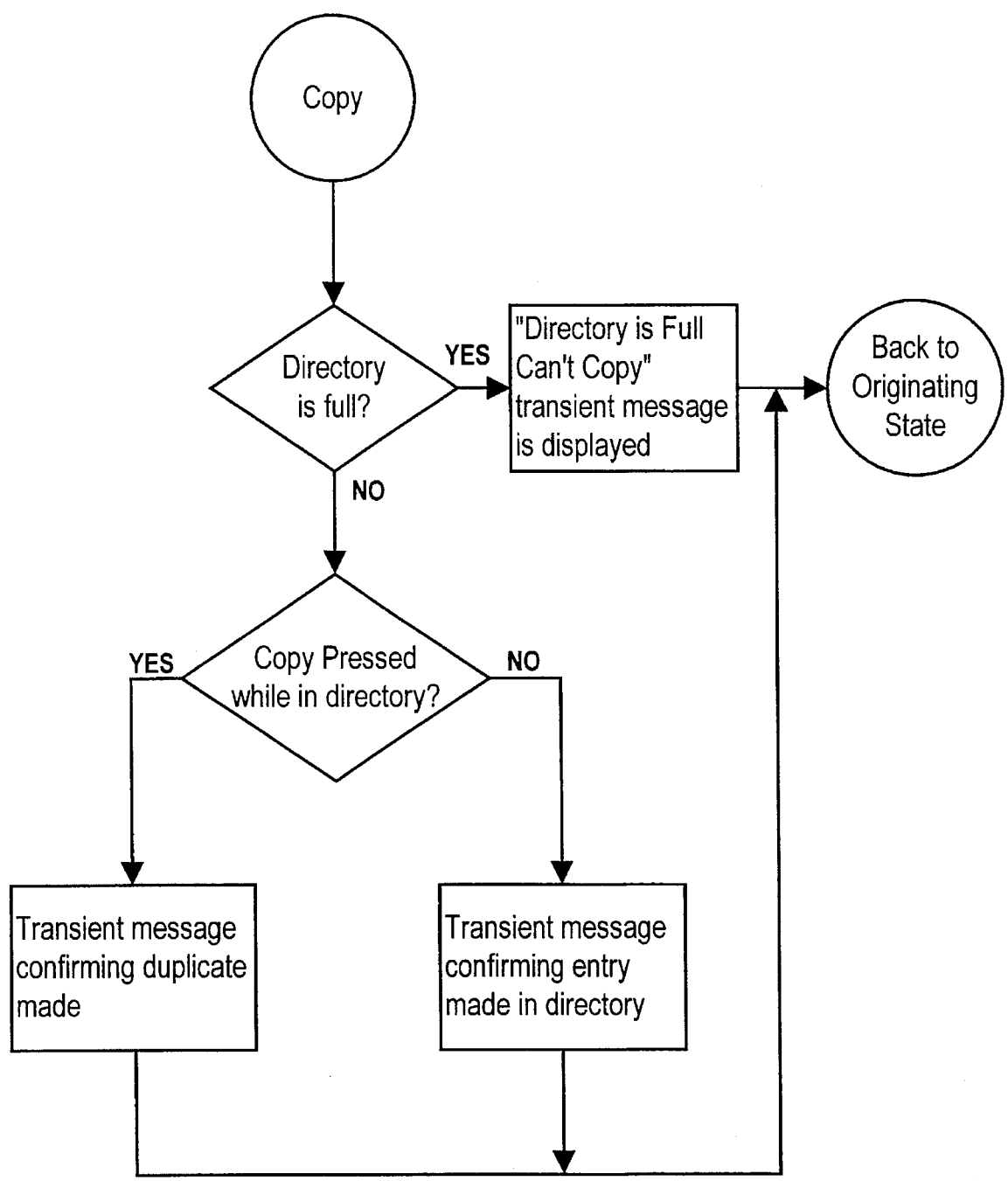
FIG. 17 is a flow-chart showing the "Copy" subroutine.

Referring now to FIG. 6, the modularity of the ADSI terminal separates telephone functionality into two units: a common base and a range of modules. Users will initially buy or lease a base and a module can later alter or upgrade the telephone by replacing the existing module with a new one when additional functionality is required.

The approach will enable users who buy their telephones to protect their original investment in the base module. At the same time, it will give telecommunications operating companies and telephone retailers the flexibility to accommodate the substantial change and diversity that is occurring.

During the past few years, telephone operating companies have introduced a series of new, network-based services. The initial custom calling services can be accessed through traditional touch-tone telephones. Subsequent service releases, however, require improved terminals. For example, calling line identification—based on the Custom Local Area Signalling Services/Call Management Services (CLASS/CMS) protocol—delivers the caller's name and number to the display so that users can decide whether to answer the call. Unlike traditional telephones, CLASS/CMS terminals incorporate a display and an internal modem to enable reception of calling information from the switch.

ADSI services enable subscribers to access and control such services as home banking, and to interact with display and audio information from a switch or server.

In addition to this broad choice of new, enhanced network services and terminals, subscribers and service providers face a proliferation of other communications products, such as cordless telephones and telephone answering devices (TADs).

To compete successfully operating companies are seeking cost-effective terminals to support the variety of new services now being introduced. Cost considerations are critical particularly in lease markets because operating companies must assume virtually all of the technology risk. Compared with consumers who buy terminals, leasers are less likely to retain their telephones because they do not have to make capital investments to replace them. Because operating companies assume the technology risk in a lease market, the impact of service and terminal evolution on consumers is minimal. The major issue for users is integrating the many available leased and retail products, such as telephones and answering machines, into one cost-effective communications platform.

Thus the present modular architecture enables consumers and telephone providers to evolve several distinct terminal types (such as cordless and TAD capabilities) and network service capabilities (such as custom-calling, CLASS/CMS, and ADSI) upon a single base. The common base provides mechanical and electrical components to support such fundamental telephony enablers as basic memory, dialpad, handset, handsfree speaker, and Hold and Link/Flash functions. This base provides a lasting platform for a succession of service modules, which consumers can easily install by sliding them into place. Each module may deliver specific service capabilities.

Other modules may offer additional capabilities—for example:

Cordless access, providing the ability to handle calls from a personal cordless telephone anywhere in the house and yard;

Telephone answering device (TAD) capability, enabling subscribers to record voice messages from various callers; and Two-line capability, aimed primarily at increasing the accessibility of small businesses.

Terminal providers can also use this modular approach to bring new products to market quickly because decoupling service modules from the base will enable manufacturers to deliver them more rapidly than was previously possible.

As may be seen in FIGS. 5 and 6, the ADSI terminal is organized so that subscribers can quickly and intuitively understand how it operates. The terminal is physically divided into two recognizable areas: one (located to the right of the terminal, near the display) for enhanced functions and controls, such as softkeys: and another (clustered to the left of the terminal) for basic telephony controls, like the touch-tone dialpad and volume control. The ADSI terminal's enhanced functionality is augmented by set-based features, which include the display and softkeys, a Directory, a Callers List, and a Redial List.

With reference to FIGS. 7 to 17 of the drawings, which are flow-charts showing how the subscriber terminal 10 handles the various events, that are initiated by the user, or that are incoming over the telephone line. The terminal 10 may at any point in time be in one of four states, which are under the control of the flow-chart of FIG. 4. The four states are:

A: On Hook Idle; the terminal 10 is connected to the network, but there is no activity on the line.

B: On Hook Busy; there is an incoming call.

C: Off Hook Not Connected; the terminal 10 is off hook, and communication between the terminal 10 and the network is taking place in the form of a dial tone.

D: Off Hook Connected: there is a connected call between the terminal 10 and another terminal. There are three forms that the call can take:
(i) a normal voice only telephone call
(ii) an ADSI session between the user and a service, where the terminal 10 provides both a voice and display interface between the user and the service
(iii) an FDM download from a service to the terminal 10. Here, a service makes a connection to the terminal 10, but does not enable the ringer, or require the user to pick up the terminal 10. The terminal 10 downloads info on its own.

An incoming call takes precedence over an FDM download, which will abort, and may resume later when the terminal 10 is free again. All off hook activities are aborted by hanging up the terminal 10.

The ADSI terminal's liquid crystal display has a large screen (8 lines deep by 21 characters wide) that is ideal for viewing service lists and menus. A Contrast button enables users to optimize their view of the display. At the bottom of the display is an area for softkey labels, which are used in combination with six physical buttons located to the right and left of the screen. Softkeys give terminals great flexibility and functionality by decoupling the functions and labels from the terminal's physical controls, and moving them to the display. Each time the service progresses to a new stage, the displayed softkey functions can change. Below the display are buttons that enable subscribers to access advanced services and call-management capabilities. Pressing the Services button, for example, gains access to such enhanced services as a home-shopping application provided by a third-party. To enable subscribers to keep records of their enhanced service transactions, a printer port is located to the underside of the terminal to support an optional printer.

The Directory is accessed by pressing the Directory button. Directory item screens can be recognized easily because they are accompanied by an "open book" icon and a letter of the alphabet, which corresponds to the section of the directory the user is accessing. Subscribers can use the dialpad to enter this information, or they can simply press the Copy button to transfer the name and number of an incoming call from the display or the Callers List to the Directory.

The Callers List provides a record of the names and numbers of people who have called. Using the Options button, this feature can be set to record all calls, no calls, or only those that were not answered. This list, which is accessed through the Callers button, is identified by an icon that looks like a person. When information about a new caller has been added to the list, the word "New" appears on the display the first time that entry is viewed.

The Redial List contains the (five) most recently dialed numbers and is accessed through the Redial button. The up-and-down scroll buttons are used to move the display window to select one of the five numbers. The right-and-left scroll buttons can be used to reveal long numbers that do not fit into the "window". The selected number can be dialed directly from the display by pressing a softkey.

In addition to enhanced service and call-management functions, the ADSI terminal provides a cluster of controls for more conventional telephony functions. These controls, such as a touch-tone dialpad and indicator lights, enable subscribers to easily use the terminal to handle telephone calls.

Near the handsfree speaker is a highly visible button that allows users to turn the handsfree feature on or mute the microphone, and an indicator lamp that shows when this feature is in use. Below the dialpad is a control that allows the user to adjust the volume of the ringer, handsflee speaker, and handset.

Although outgoing calls can be dialed manually by using the dialpad, the ADSI terminal allows calls to be initiated in other ways. When a number from the Directory or the Callers List appears on the screen, for example, it can be dialed by lifting the handset, pressing the handsflee button, or using the Dial softkey shown on the display.

To the right of the handset is a light bar that is illuminated when an extension phone is picked up during a call, and flashes when the telephone rings or a call is placed on hold. This light bar also flashes when a new entry has been placed in the user's network-based voice-mail service. At the same time, the phrase "Message Waiting" is displayed on the screen.

Above the dialpad are controls that enable users to Hold to call, Link or Flash to a waiting call, and release a completed call using the Goodbye button. Users can also personalise their terminals by pressing the Options button. The screen will then display the available options, which include the ability to:

Set the ringer to one of three distinct sounds;

Time the duration of calls—for example, to record the time spent talking to clients;

Modify, the terminal's dialing operation;

Display information in English, French, or Spanish;

Set the time and data;

Program the Callers List to record all calls, no calls, or unanswered calls only; and Display local calls without an area code, so they can be dialed without further change.

FIGS. 7 to 17, which show high-level flow-charts derailing the various steps of operation of the subscriber terminal in response to incoming signals or user initiated actions. The flow-charts contain descriptive narrative in the decision blocks, and are explicit and self explanatory. They are intended to complement the present detailed description.

Subscribers may personalize the ADSI terminal and use it easily and intuitively. By combining basic telephony functions with a large display and flexible softkeys, as well as voice, text, and icon-based graphic prompting and information capabilities, the ADSI terminal provides convenient access to enhanced services.

What is claimed is:

1. A method of operating a subscriber telephone terminal having a display screen, a microprocessor, and a plurality of soft-keys, comprising the steps of: detecting an incoming signal from a telephone switching office; determining that said incoming signal is a data burst; allowing said data burst to control said display screen and said soft-keys and to temporarily define at least one soft-key for response entry by a user; causing said microprocessor to display information on said display screen downloaded in said data burst in response to said response entry by the user; storing a virtual display page, a virtual soft-key table, and a return character string, downloaded during an analog display services interface (ADSI) session, prior to display on said screen; and determining if an ADSI session is in progress, and if yes then allowing said ADSI to update said screen display and soft-keys on a real-time basis.

2. The method as defined in claim 1, wherein a data burst alert proceeds an ADSI session and causes said microprocessor to mute said subscriber telephone terminal.

3. An interactive subscriber telephone terminal, comprising: a display screen; a plurality of temporarily definable response or data entry keys; local control means for selectively causing said display screen or said response or data entry keys to be controlled by one of; remote signals transmitted to the interactive subscriber telephone terminal from a telephone switching office, and said local control means; said remote signals causing said local control means to respond to one of three modes; a first mode for audio and visual prompting, a second mode for display of data, and a third mode for access to said interactive subscriber telephone terminal when on-hook, said access to said interactive subscriber telephone terminal comprising downloading of data into storage; and said storage adapted under control of said local control means for storing a virtual display page, a virtual soft-key table, and a return character string, downloaded during a data burst of an analog display services interface (ADSI) transmission via said switching office.

4. The telephone terminal as defined in claim 3, further comprising means for responding to said ADSI transmission by enabling and disabling functions of said subscriber telephone terminal.

5. The telephone terminal as defined in claim 3, comprising at least one plug-in module compatible with a predetermined virtual display page.

6. The telephone terminal as defined in claim 5, said plug-in module incorporating said display screen therein.

7. The telephone terminal as defined in claim 3, adapted to receive a plurality of plug-in modules each having a different functional characteristic.

* * * * *